(12) United States Patent
Henry (10) Patent No.: US 8,857,530 B2
(45) Date of Patent: *Oct. 14, 2014

(54) AUTOMATIC DEPTH CONTROL SYSTEM FOR AN AGRICULTURAL IMPLEMENT

(75) Inventor: Jim Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 628 days.

This patent is subject to a terminal disclaimer.

(21) Appl. No.: 13/041,563

(22) Filed: Mar. 7, 2011

(65) Prior Publication Data

US 2012/0227992 A1 Sep. 13, 2012

(51) Int. Cl.
*A01B 63/111* (2006.01)
*A01B 63/114* (2006.01)

(52) U.S. Cl.
CPC ................................. *A01B 63/114* (2013.01)
USPC ............................................................ 172/4

(58) Field of Classification Search
USPC ............................ 172/1–11, 239; 56/10.2 R, 56/10.2 A–10.2 F; 91/361, 459, 461, 91/527–534
See application file for complete search history.

(56) References Cited

U.S. PATENT DOCUMENTS

| | | | |
|---|---|---|---|
| 2,851,014 A | 9/1958 | Healy | |
| 3,666,284 A | 5/1972 | Hunter et al. | |
| 4,221,266 A * | 9/1980 | Fardal | 172/4 |
| 4,279,138 A | 7/1981 | Van Der Lely et al. | |
| 4,286,386 A | 9/1981 | Long | |
| 4,306,732 A | 12/1981 | Pettibone | |
| 4,355,688 A | 10/1982 | Hamm et al. | |
| 4,471,304 A | 9/1984 | Wolf | |
| 4,506,898 A | 3/1985 | Herron | |
| 4,518,044 A | 5/1985 | Wiegardt et al. | |
| 4,600,060 A | 7/1986 | Winter et al. | |
| 4,622,884 A | 11/1986 | Buchl | |
| 4,646,620 A | 3/1987 | Buchl | |
| 4,723,608 A | 2/1988 | Pearson | |
| 4,839,591 A | 6/1989 | Nomura et al. | |
| 4,915,014 A | 4/1990 | Gilmore et al. | |
| 4,967,851 A | 11/1990 | Barber | |
| 5,065,681 A | 11/1991 | Hadley | |
| 5,160,239 A | 11/1992 | Allen et al. | |
| 5,231,352 A | 7/1993 | Huber | |
| 5,277,257 A | 1/1994 | Thompson et al. | |

(Continued)

FOREIGN PATENT DOCUMENTS

CA 1043003 11/1978
DE 3139638 4/1983

(Continued)

*Primary Examiner* — Robert Pezzuto
(74) *Attorney, Agent, or Firm* — Rebecca L. Henkel (57) ABSTRACT

An agricultural implement system is provided that includes an implement, and a fluid control unit configured to mount to a tow vehicle. The agricultural implement system also includes a depth control cylinder mounted to a frame of the implement and fluidly coupled to the fluid control unit. The depth control cylinder is configured to adjust a penetration depth of a ground engaging tool of the implement by varying a height of a ground engaging wheel. In addition, the agricultural implement system includes a sensor communicatively coupled to the fluid control unit and configured to output signals indicative of the penetration depth of the ground engaging tool. The fluid control unit is configured to automatically control fluid flow to the depth control cylinder based on the signals to maintain a user-selectable penetration depth.

20 Claims, 4 Drawing Sheets

(56) References Cited

U.S. PATENT DOCUMENTS

| | | |
|---|---|---|
| 5,300,918 A | 4/1994 | Becker |
| 5,339,906 A | 8/1994 | Fox et al. |
| 5,366,024 A | 11/1994 | Payne |
| 5,427,182 A | 6/1995 | Winter |
| 5,562,165 A | 10/1996 | Janelle et al. |
| 5,568,760 A | 10/1996 | Volzer |
| 5,957,218 A | 9/1999 | Noonan et al. |
| 5,975,215 A | 11/1999 | Jensen et al. |
| 6,068,064 A | 5/2000 | Bettin et al. |
| 6,076,611 A | 6/2000 | Rozendaal et al. |
| 6,085,846 A | 7/2000 | Buchl et al. |
| 6,129,155 A | 10/2000 | Lombardi |
| 6,269,885 B1 | 8/2001 | Barber et al. |
| 6,371,214 B1 | 4/2002 | Anwar et al. |
| 6,698,523 B2 | 3/2004 | Barber |
| 6,786,130 B2 | 9/2004 | Steinlage et al. |
| 6,935,253 B2 | 8/2005 | Murray et al. |
| 7,034,527 B2 | 4/2006 | Low et al. |
| 7,063,167 B1 | 6/2006 | Staszak et al. |
| 7,178,446 B2 | 2/2007 | Kucher et al. |
| 7,259,553 B2 | 8/2007 | Arns, Jr. et al. |
| 7,307,418 B2 | 12/2007 | Low et al. |
| 8,235,130 B2 * | 8/2012 | Henry et al. .......... 172/4 |
| 2003/0127235 A1 | 7/2003 | Dannigkeit |
| 2004/0079223 A1 | 4/2004 | Steinlage et al. |
| 2005/0173137 A1 | 8/2005 | Buchl |
| 2005/0274254 A1 | 12/2005 | Kadlicko |
| 2007/0066374 A1 | 3/2007 | Archer et al. |
| 2007/0214952 A1 | 9/2007 | Kossmann |
| 2009/0301743 A1 | 12/2009 | Henry et al. |
| 2009/0313860 A1 | 12/2009 | Breiner et al. |

FOREIGN PATENT DOCUMENTS

| | | |
|---|---|---|
| DE | 3743552 | 7/1989 |
| GB | 2056692 | 3/1981 |
| GB | 2106984 | 4/1983 |
| WO | WO9407037 | 3/1994 |

* cited by examiner

AUTOMATIC DEPTH CONTROL SYSTEM FOR AN AGRICULTURAL IMPLEMENT

BACKGROUND

The invention relates generally to ground working equipment, such as agricultural equipment, and more specifically, to an automatic depth control system for an agricultural implement.

Certain agricultural implements include a frame having multiple ground engaging tools configured to till soil. Such implements may also include depth control cylinders extending between the frame and respective ground engaging wheels. The depth control cylinders are configured to adjust a penetration depth of the ground engaging tools by varying a height of the wheels relative to the frame. For example, the depth control cylinders may be fluidly coupled to a manually operated directional control valve within a tow vehicle, such as a tractor. In such a configuration, an operator may selectively supply pressurized fluid to a rod side or a cap side of each depth control cylinder to adjust a height of the frame relative to the soil surface. Certain implements employ a depth stop valve configured to automatically terminate fluid flow to the depth control cylinders when a desired penetration depth is achieved, thereby maintaining the ground engaging tools at the desired penetration depth. Unfortunately, to vary the penetration depth of such an implement, the operator must stop the tow vehicle, approach the implement, and manually adjust the depth stop valve. Such a procedure may significantly increase the duration of tillage operations.

BRIEF DESCRIPTION

The present invention provides an agricultural implement system including a fluid control unit mounted to a tow vehicle and configured to automatically adjust a height of an implement frame to maintain a user-selectable penetration depth of ground engaging tools. In an exemplary embodiment, the agricultural implement system includes a fluid control unit configured to mount to a tow vehicle. The agricultural implement system also includes an implement having a frame, a ground engaging tool rigidly coupled to the frame, and a ground engaging wheel configured to support the frame during operation of the implement. The agricultural implement system further includes a depth control cylinder mounted to the frame and fluidly coupled to the fluid control unit. The depth control cylinder is configured to adjust a penetration depth of the ground engaging tool by varying a height of the ground engaging wheel relative to the frame. In addition, the agricultural implement system includes a sensor communicatively coupled to the fluid control unit and configured to output signals indicative of the penetration depth of the ground engaging tool. The fluid control unit is configured to automatically control fluid flow to the depth control cylinder based on the signals to maintain a user-selectable penetration depth. Because the fluid control unit automatically controls the penetration depth of the ground engaging tool based on input from the sensor, a manually operated depth stop valve located on the implement may be obviated. As a result, an operator may adjust penetration depth without stopping the tow vehicle, thereby substantially reducing the duration of tillage operations.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments disclosed herein may substantially reduce the cost and complexity associated with automatically controlling penetration depth of ground engaging tools within an agricultural implement. Specifically, the agricultural implement system described below includes a controller configured to directly adjust a tow vehicle mounted depth control valve, thereby automatically maintaining a user-selectable penetration depth. Because the tow vehicle depth control valve is directly actuated, controllers and/or additional directional control valves, which may be coupled to the implement in alternative configurations to control penetration depth, may be obviated. By way of example, an operator may input a desired penetration depth into a user interface mounted within a cab of the tow vehicle. The controller will then compare a measured penetration depth of the ground engaging tools to the input penetration depth. If the measured penetration depth is deeper than desired, the controller will instruct the depth control valve to raise the implement. Conversely, if the penetration depth is shallower than desired, the controller will instruct the depth control valve to lower the implement. In this manner, the user-selected penetration depth will be maintained via direct actuation of the tow vehicle mounted depth control valve.

Figure 1:
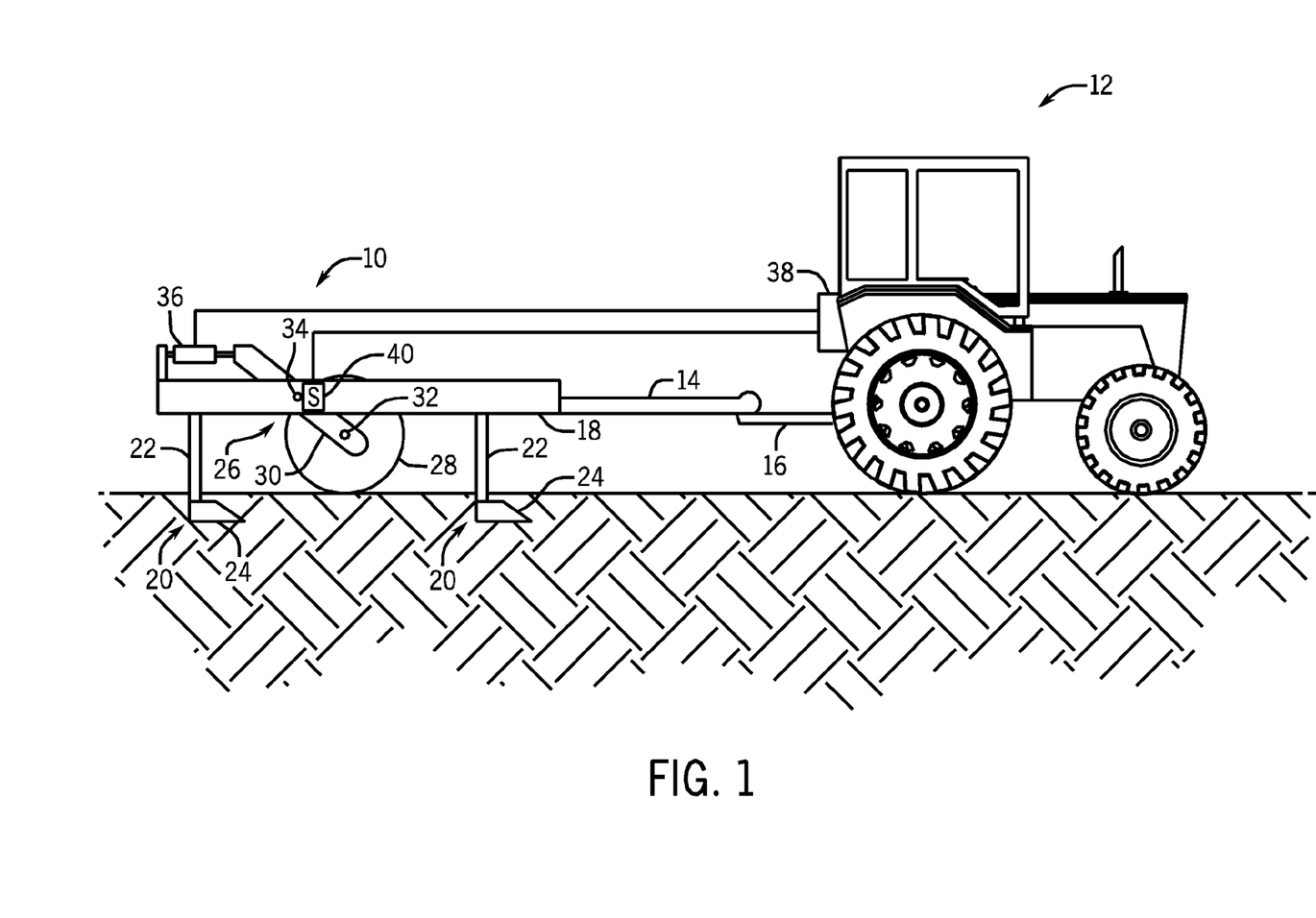
FIG. 1 is a side view of an exemplary agricultural implement system, including a tow vehicle and an agricultural implement.

FIG. 1 is a side view of an exemplary agricultural implement system, including an agricultural implement 10. The implement 10 is designed to be towed behind a work vehicle, such as the illustrated tractor 12. In the illustrated embodiment, the implement 10 includes a tongue assembly 14 having a hitch used to attach to an appropriate tractor hitch 16 via a ball, clevis, or other coupling. For example, a tongue of the implement 10 may be connected to a drawbar of the tractor, or a mast of the implement may be connected to a 3-point hitch of the tractor. As illustrated, the tongue assembly 14 is coupled to an implement frame 18 configured to support multiple ground engaging tools 20. In the illustrated embodiment, each ground engaging tool 20 includes a shank 22 and a tillage point 24. As will be appreciated, alternative ground engaging tools 20, such as coulters, disc blades and/or tines, may be employed in alternative embodiments. Furthermore, while two ground engaging tools 20 are coupled to the frame 18 in the illustrated embodiment, it should be appreciated that alternative embodiments may include significantly more ground engaging tools. For example, certain implements may include 2, 4, 6, 8, 10, 12, 14, 16, 18, 20, or more ground engaging tools 20.

In the illustrated embodiment, the implement 10 includes a ground engaging wheel assembly 26 having a wheel 28 and an arm 30. The wheel 28, which is pivotally coupled to a first end of the arm 30 via an axle 32, is configured to support the implement 10 during tillage operations. The arm 30, in turn, is rotatably mounted to the frame 18 via a rockshaft 34. In this configuration, a height or elevation of the frame 18 relative to the soil surface may be varied by rotating the arm 30 relative to the frame 18. For example, rotating the arm 30 in a clockwise direction will increase the height of the frame 18, thereby decreasing the penetration depth of the ground engaging tools 20. Conversely, rotating the arm 30 in a counter-clockwise direction will decrease the height of the frame 18, thereby increasing the penetration depth of the ground engaging tools 20. In this manner, a desired penetration depth may be particularly selected based on soil conditions, crop selection and/or other parameters associated with tillage operations. Furthermore, the height of the frame 18 may be increased to extract the ground engaging tools 20 from the soil, thereby facilitating transport of the implement 10.

In the illustrated embodiment, the implement 10 includes a depth control cylinder 36 extending between the frame 18 and a second end of the arm 30. The depth control cylinder 36 is fluidly coupled to a fluid control unit 38 of the tow vehicle 12, and configured to rotate the arm 30 relative to the frame 18. As discussed in detail below, the fluid control unit 38 includes a depth control valve configured to selectively direct pressurized fluid to a cap side or a rod side of the cylinder 36, thereby adjusting the height of the frame 18 relative to the soil surface. In addition, the fluid control unit 38 includes a controller configured to adjust the position of the depth control valve based on signals indicative of penetration depth of the ground engaging tools 20. For example, in the illustrated embodiment, the implement 10 includes a sensor 40 communicatively coupled to the fluid control unit 38, and configured to output signals indicative of the frame height. The fluid control unit 38 is configured to automatically control fluid flow to the depth control cylinder based on the signals to maintain a user-selectable penetration depth. For example, an operator may select a desired penetration depth of the ground engaging tools 20 via a user interface within the tow vehicle 12. The fluid control unit 38, in turn, may automatically maintain the desired penetration depth by adjusting fluid flow to the depth control cylinder 36. For example, if the controller determines that the penetration depth is deeper than desired, the fluid control unit 38 may increase the frame height, thereby reducing penetration depth. Conversely, if the controller determines that the penetration depth is shallower than desired, the fluid control unit 38 may decrease the height of the frame 18 to compensate.

In the illustrated embodiment, the sensor 40 is configured to measure rotation of the arm 30 relative to the frame 18, thereby enabling the fluid control unit 38 to determine ground engaging tool penetration depth based on the height of the frame 18 above the soil surface. For example, the sensor 40 may include a rotary potentiometer coupled to the rockshaft 34, and configured to output signals indicative of arm rotation. As discussed in detail below, other embodiments may include a linear potentiometer configured to measure a position of the arm 30 relative to the frame 18, a linear potentiometer configured to measure extension of a depth control cylinder rod, or a transducer (e.g., ultrasonic, electromagnetic, infrared, etc.) configured to measure a height of the frame 18 above the soil surface. Furthermore, it should be appreciated that other sensors 40 configured to directly or indirectly measure the penetration depth of the ground engaging tools 20 may be utilized in alternative embodiments.

While a single ground engaging wheel assembly 26 and depth control cylinder 36 are employed in the illustrated embodiment, it should be appreciated that alternative embodiments may include more wheel assemblies 26 and a corresponding number of depth control cylinders 36. For example, as discussed in detail below, the implement 10 may include multiple frame sections, with each frame section having an independently adjustable ground engaging wheel assembly. In such a configuration, each depth control cylinder may be fluidly coupled to a respective depth control valve within the fluid control unit 38. Consequently, a height of each frame section relative to the soil surface may be independently adjustable, thereby enabling the ground engaging tools 20 to maintain a substantially constant penetration depth despite variations in the soil surface. Because the fluid control unit 38 automatically controls the penetration depth of the ground engaging tools 20 based on input from the sensor 40, a manually operated depth stop valve located on the implement 10 may be obviated. As a result, an operator may adjust penetration depth without stopping the tow vehicle 12, thereby substantially reducing the duration of tillage operations. Furthermore, because the fluid control unit 38 is mounted to the tow vehicle 12, controllers and/or directional control valves, which may be coupled to the implement in certain embodiments to control penetration depth, may be obviated, thereby substantially reducing the cost and complexity of the automatic depth control system.

Figure 2:
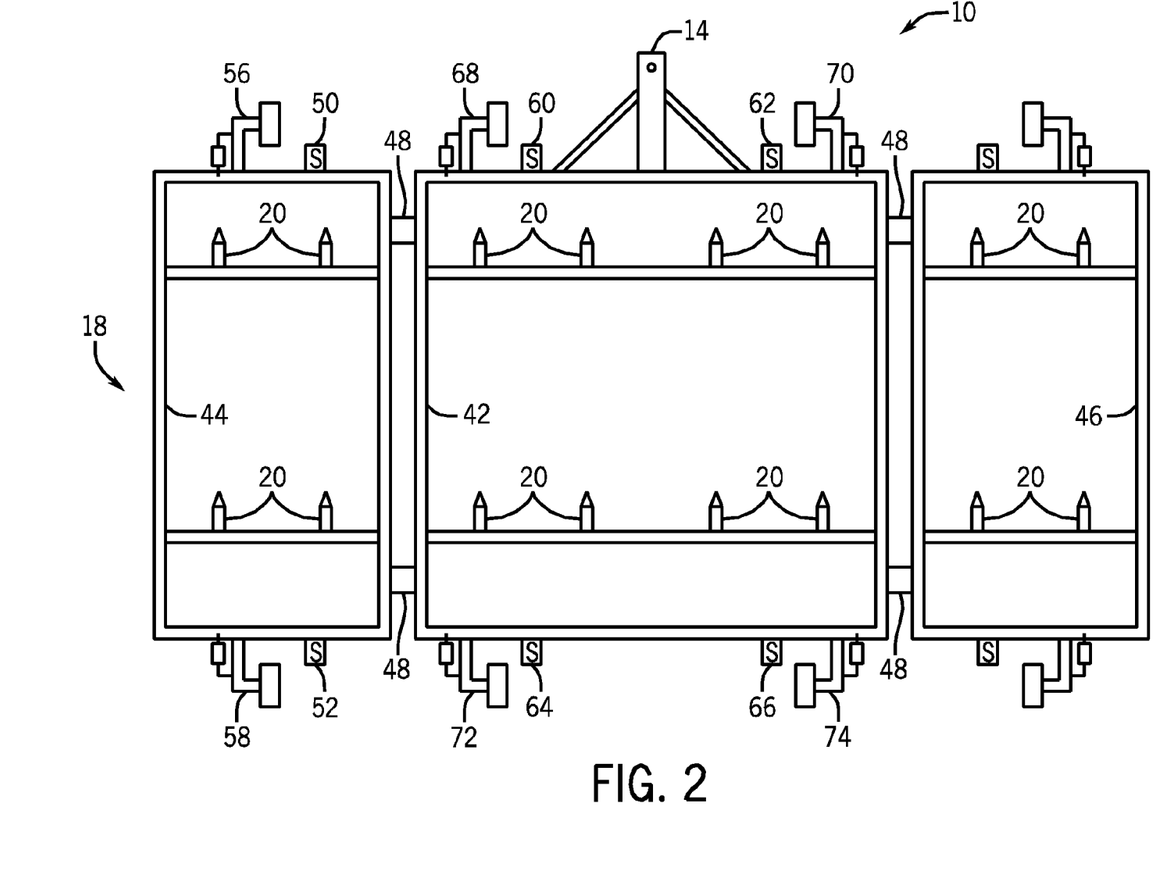
FIG. 2 is a top view of an exemplary agricultural implement that may be employed within the agricultural implement system of FIG. 1.

FIG. 2 is a top view of an exemplary agricultural implement 10 that may be employed within the agricultural implement system of FIG. 1. As illustrated, the implement frame 18 includes a center frame section 42, a left frame section 44 and a right frame section 46. Each frame section includes multiple ground engaging tools 20, such as the illustrated tillage points, configured to till soil as the implement 10 is pulled through a field. Specifically, each frame section includes two tool bars configured to support two rows of ground engaging tools 20. However, it should be appreciated that more or fewer rows may be employed in alternative embodiments. Furthermore, the number of ground engaging tools 20 coupled to each tool bar may be particularly selected to provide a desired degree of tillage.

In the illustrated embodiment, the center frame section 42 is coupled to the left frame section 44 by two joints 48, and to the right frame section 46 by two joints 48. The joints 48 enable the height of each frame section to be independently adjusted relative to the soil surface. In addition, the joints 48 enable the left and right frame sections 44 and 46 to tilt relative to the center frame section 42. As a result of this configuration, each frame section may remain substantially parallel to the soil surface during tillage operations, thereby enabling the ground engaging tools 20 to maintain a substantially constant penetration depth despite variations in the soil surface.

As illustrated, the left frame section 44 includes a first sensor 50 positioned at the front of the section 44 relative to the direction of travel, and a second sensor 52 positioned at the rear of the section 44. Each sensor 50 and 52 is communicatively coupled to the fluid control unit, and configured to output signals indicative of the height of the sensor above the soil surface. For example, each sensor 50 and 52 may include a transducer configured to emit a field (e.g., electromagnetic, ultrasonic, infrared, etc.) toward the soil surface, and to determine a distance between the sensor and the soil surface based on the received feedback. By measuring the height of the front and back of the left frame section 44 the average height and the orientation of the left frame section 44 relative to the soil surface may be determined.

The left frame section 44 also includes a first ground engaging wheel assembly 56 positioned at the front of the frame section 44 relative to the direction of travel, and a second ground engaging wheel assembly 58 positioned at the rear of the frame section 44. Similar to the wheel assembly 26 described above with reference to FIG. 1, each wheel assembly 56 and 58 includes a ground engaging wheel and a depth control cylinder configured to vary a height of the ground engaging wheel relative to the frame section 44. In certain embodiments, each depth control cylinder may be fluidly coupled to a respective depth control valve within the fluid control unit. In such embodiments, the height of each ground engaging wheel relative to the frame section 44 will be independently adjustable. Consequently, the fluid control unit may adjust the position of each ground engaging wheel to maintain the frame section 44 at a desired height and at a desired orientation (e.g., substantially parallel to the soil surface), thereby maintaining the ground engaging tools 20 at a desired penetration depth. For example, if the first and second sensors 50 and 52 indicate that the front of the frame section 44 is higher than the rear of the frame section, the fluid control unit may adjust fluid flow to the depth control cylinders, thereby lowering the first ground engaging wheel and/or raising the second ground engaging wheel. As a result, the height and orientation of the left frame section 44 about an axis substantially perpendicular to the direction of travel may be substantially maintained.

Similar to the left frame section, the right frame section 46 includes a front wheel assembly and a rear wheel assembly configured to adjust the height and orientation of the frame section. In addition, the center frame section 42 includes four ground engaging wheel assemblies configured to facilitate height adjustment and multi-axis variations in orientation of the frame section. As illustrated, the center frame section 42 includes a first sensor 60 positioned at a front left portion of the frame section, a second sensor 62 positioned at a front right portion of the frame section, a third sensor 64 positioned at a rear left portion of the frame section, and a fourth sensor 66 positioned at a rear right portion of the frame section. Similar to the sensors 50 and 52 of the left frame section 44, the sensors 60, 62, 64 and 66 are communicatively coupled to the fluid control unit, and configured to output signals indicative of the height of the sensor above the soil surface. Consequently, a controller within the fluid control unit may determine an orientation of the center frame section 42 about an axis perpendicular to the direction of travel and/or about an axis parallel to the direction of travel. The controller may also determine the average height of the frame section relative to the soil surface based on the signals from the sensors.

In the illustrated embodiment, the center frame section 42 includes a first ground engaging wheel assembly 68 positioned at the front left portion of the frame section, a second ground engaging wheel assembly 70 positioned at the front right portion of the frame section, a third ground engaging wheel assembly 72 positioned at the rear left portion of the frame section, and a fourth ground engaging wheel assembly 74 positioned at the rear right portion of the frame section. Similar to the wheel assembly 26 described above with reference to FIG. 1, each wheel assembly 68, 70, 72 and 74 includes a ground engaging wheel and a depth control cylinder configured to vary a height of the ground engaging wheel relative to the center frame section 42. In certain embodiments, each depth control cylinder may be fluidly coupled to a respective depth control valve within the fluid control unit. In such embodiments, the height of each ground engaging wheel relative to the frame section 42 will be independently adjustable. Consequently, the fluid control unit may adjust the position of each ground engaging wheel to maintain the frame section 44 at a desired height and at a desired orientation (e.g., substantially parallel to the soil surface), thereby maintaining the ground engaging tools 20 at a desired penetration depth. For example, if the sensors 60, 62, 64 and 66 indicate that the front of the frame section 42 is higher than the rear of the frame section, the fluid control unit may adjust fluid flow to the depth control cylinders, thereby lowering the first and second ground engaging wheels and/or raising the third and fourth ground engaging wheels. Similarly, if the sensors 60, 62, 64 and 66 indicate that the left portion of the frame section 42 is higher than the right portion of the frame section, the fluid control unit may adjust fluid flow to the depth control cylinders, thereby lowering the first and third ground engaging wheels and/or raising the second and fourth ground engaging wheels. As a result, the height and orientation of the center frame section 42 about axes parallel and perpendicular to the direction of travel may be substantially maintained.

While three frame sections 42, 44 and 46 are included in the illustrated implement 10, it should be appreciated that alternative embodiments may include more or fewer frame sections. For example, certain embodiments may include 1, 2, 3, 4, 5, 6, or more frame sections, in which a height and/or orientation of each frame section is individually adjustable. Furthermore, while each ground engaging wheel assembly in the illustrated embodiment is controlled by an independent depth control valve within the fluid control unit, it should be appreciated that alternative embodiments may include multiple wheel assemblies controlled by a single depth control valve. For example, in certain embodiments, the depth control cylinders of the first and second ground engaging wheel assemblies 68 and 70 of the center frame section 42 may be fluidly coupled to a first depth control valve (e.g., in a serial flow arrangement), while the depth control cylinders of the third and fourth ground engaging wheel assemblies 72 and 74 are fluidly coupled to a second depth control valve. In such embodiments, the center frame section 42 may be tilted about an axis perpendicular to the direction of travel, but not parallel to the direction of travel. In addition, the depth control cylinders of the first and second ground engaging wheel assemblies 56 and 58 of the left frame section 44 may be fluidly coupled to a single depth control valve within the fluid control unit. In such a configuration, the height of the left frame section 44 may be adjustable, but the orientation may be fixed.

Figure 3:
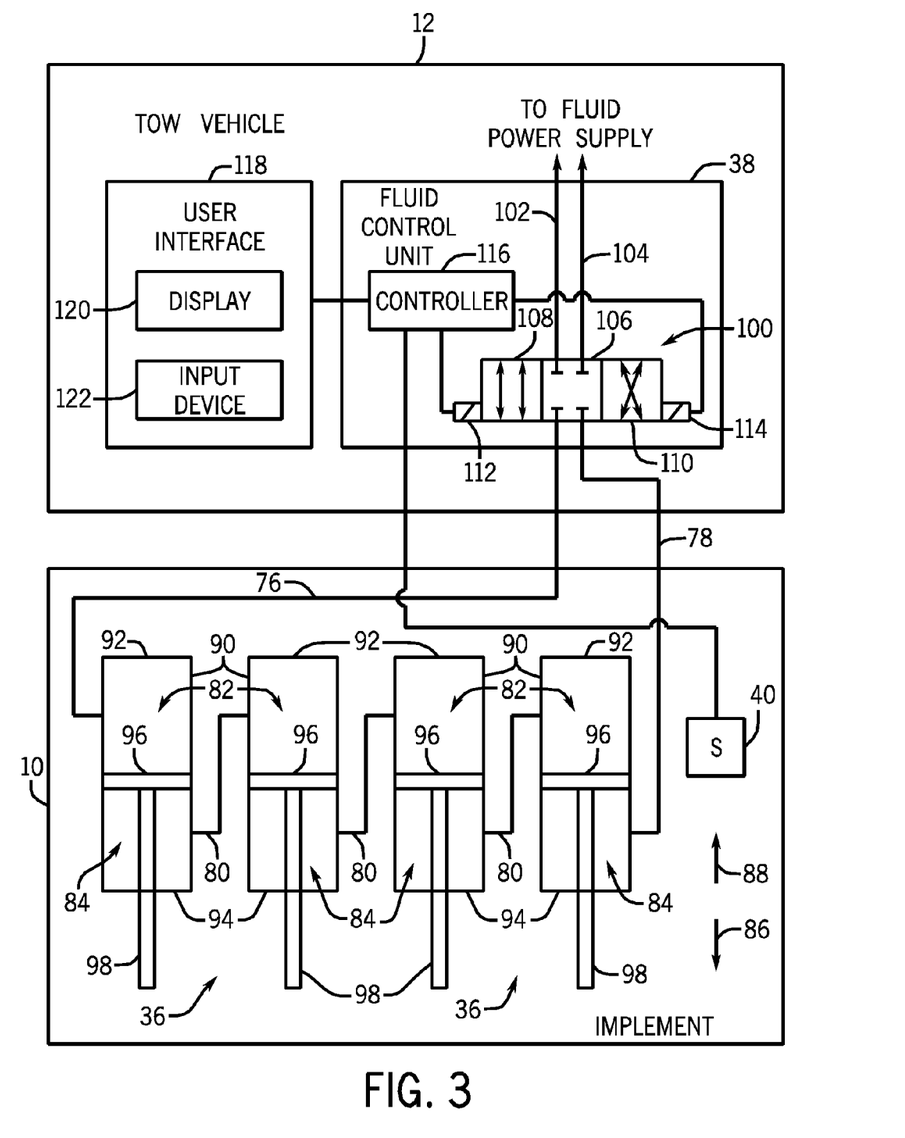
FIG. 3 is a schematic diagram of an exemplary fluid control unit configured to automatically adjust a penetration depth of ground engaging tools on an agricultural implement.

FIG. 3 is a schematic diagram of an exemplary fluid control unit configured to automatically adjust a penetration depth of ground engaging tools on the agricultural implement. As illustrated, a first fluid conduit 76 and a second fluid conduit 78 extend to four depth control cylinders 36. In the illustrated embodiment, the depth control cylinders 36 are arranged in a serial flow configuration in which the cylinders 36 are fluidly coupled to one another by connecting conduits 80. As discussed in detail below, the serial flow configuration enables each cylinder 36 to extend and retract a substantially equal distance when pressurized fluid is supplied to the cylinders. While the illustrated embodiment includes four depth control cylinders 36, it should be appreciated that alternative embodiments may include more or fewer cylinders (e.g., 1, 2, 3, 4, 5, 6, 7, 8, or more). Furthermore, certain implements may include ground engaging wheel assemblies having independent depth control cylinders. Alternative embodiments may include multiple wheel assemblies actuated by a single depth control cylinder 36, or multiple groups of wheel assemblies, with each group being actuated by a single depth control cylinder 36. In addition, it should be appreciated that alternative embodiments may include depth control cylinders 36 arranged in a parallel flow configuration in which each cylinder 36 is directly coupled to the first and second fluid conduits 76 and 78.

In the illustrated embodiment, the first fluid conduit 76 is coupled to a cap side 82 of a first cylinder 36, while the second fluid conduit 78 is coupled to a rod side 84 of a fourth cylinder 36. In addition, the rod side 84 of the first cylinder 36 is fluidly coupled to the cap side 82 of a second cylinder 36 via a first connecting conduit 80, the rod side 84 of the second cylinder 36 is fluidly coupled to the cap side 82 of a third cylinder 36 via a second connecting conduit 80, and the rod side 84 of the third cylinder 36 is fluidly coupled to the cap side 82 of the fourth cylinder 36 via a third connecting conduit 80. Consequently, applying fluid pressure to the first conduit 76 induces the first depth control cylinder 36 to extend in a direction 86. As a result, the remaining cylinders are also driven in the direction 86 as fluid from the rod side 84 of the first, second and third cylinders 36 is driven into the cap side 82 of the second, third and fourth cylinders 36. Similarly, applying fluid pressure to the second conduit 78 will induce each depth control cylinder 36 to retract in a direction 88. It should be appreciated that in alternative embodiments, the depth control cylinders 36 may be reversed such that the first fluid conduit 76 is coupled to the rod side 84 of the first cylinder, the second fluid conduit 78 is coupled to the cap side 82 of the fourth cylinder 36, and the connecting conduits 80 extend from the cap side 82 of one cylinder to the rod side 84 of a subsequent cylinder. In such embodiments, applying fluid pressure to the first fluid conduit 76 will induce the depth control cylinders 36 to retract in the direction 88, while applying fluid pressure to the second conduit 78 will induce the cylinders 36 to extend in the direction 86.

As illustrated, each depth control cylinder 36 includes a barrel 90 having an end cap 92, a gland 94, and a piston 96. As will be appreciated, the cap side 82 is defined by a volume formed from the piston 96, barrel 90 and end cap 92, while the rod side 84 is defined by a volume formed from the piston 96, barrel 90 and gland 94. Furthermore, a rod 98 is coupled to the piston 96 such that movement of the piston 96 drives the rod 98 to translate in the direction 86 and/or 88. As will be further appreciated, various seals may be employed between the rod 98 and the gland 94 to block a flow of fluid from exiting the cylinder 36. In addition, the piston 96 includes additional seals to block a flow of fluid between the cap side 82 and the rod side 84 of the cylinder 36. In the illustrated embodiment, applying fluid pressure to the first conduit 76 increases pressure to the cap side 82 of each cylinder 36, thereby driving the piston 96 and the rod 98 in the direction 86. Conversely, applying fluid pressure to the second conduit 78 increases pressure to the rod side 84 of each cylinder 36, thereby driving the piston 96 and the rod 98 in the direction 88. It should be appreciated that increasing pressure to one conduit may be accompanied by a decrease in pressure to the other conduit to facilitate movement of each piston 96 within the respective barrel 90. It should further be appreciated that the depth control cylinders 36 may be particularly configured to operate based on pneumatic or hydraulic fluid pressure.

As illustrated, the first conduit 76 and the second conduit 78 are coupled to a depth control valve 100 (e.g., directional control valve) within the fluid control unit 38. The depth control valve 100 is configured to control fluid flow from a fluid power supply to the depth control cylinders 36. In the illustrated embodiment, the directional control valve 100 is a three-position/four-way hydraulic valve configured to control a flow of hydraulic fluid to the cylinders 36. However, it should be appreciated that a pneumatic directional control valve 100 may be employed in embodiments utilizing pneumatic cylinders 36. As illustrated, a supply conduit 102 and a return conduit 104 are coupled to the depth control valve 100. The supply conduit 102 is configured to provide fluid to the fluid control unit 38, while the return conduit 104 enables fluid to return to the fluid power supply. In certain embodiments, the fluid power supply may be coupled to the tow vehicle 12.

In the illustrated embodiment, the depth control valve 100 includes a first position 106 configured to block fluid flow from the supply and return conduits 102 and 104 to the first and second conduits 76 and 78. While the depth control valve 100 is in the first position 106, fluid pressure within the cap side 82 and the rod side 84 of each cylinder 36 will be maintained, thereby holding the ground engaging tools 20 at a desired penetration depth. The depth control valve 100 also includes a second position 108 that establishes a fluid connection between the supply conduit 102 and the first conduit 76, and between the return conduit 104 and the second conduit 78. While the depth control valve 100 is in the second position 108, fluid will flow from the supply conduit 102 to the cap side 82 of the first cylinder 36 and from the rod side 84 of the fourth cylinder 36 to the return conduit 104, thereby inducing the piston rod 98 of each cylinder 36 to extend in the direction 86. Consequently, transitioning the depth control valve 100 to the second position 108 drives the ground engaging wheels downwardly, thereby decreasing the penetration depth of the ground engaging tools 20. Furthermore, the depth control valve 100 includes a third position 110 that establishes a fluid connection between the supply conduit 102 and the second conduit 78, and between the return conduit 104 and the first conduit 76. While the depth control valve 100 is in the third position 110, fluid will flow from the supply conduit 102 to the rod side 84 of the fourth cylinder 36 and from the cap side 82 of the first cylinder 36 to the return conduit 104, thereby inducing the piston rod 98 of each cylinder 36 to retract in the direction 88. Consequently, transitioning the depth control valve 100 to the third position 110 drives the ground engaging wheels upwardly, thereby increasing the penetration depth of the ground engaging tools 20.

As illustrated, the depth control valve 100 includes two actuators 112 and 114 configured to adjust the position of the valve 100. In the illustrated embodiment, the first actuator 112 is a solenoid configured to drive the depth control valve 100 to the second position 108, and the second actuator 114 is a solenoid configured to drive the valve 100 to the third position 110. Both the first and second actuators 112 and 114 are communicatively coupled to a controller 116 configured to adjust the position of the depth control valve 100. Consequently, the fluid control unit controller 116 may vary the penetration depth of the ground engaging tools 20 by adjusting the position of the depth control valve 100. For example, the controller 116 may increase the penetration depth of the ground engaging tools 20 by driving the depth control valve 100 to the third position 110 via the second actuator 114. The controller 116 may also decrease the penetration depth of the ground engaging tools 20 by driving the depth control valve 100 to the second position 108 via the first actuator 112.

In the illustrated embodiment, the controller 116 is communicatively coupled to a user interface 118 within the tow vehicle 12. For example, the user interface 118 may be located within an interior of a tractor to facilitate access by an operator. As illustrated, the user interface 118 includes a display 120 and an input device 122. The display 120 may be configured to present a visual and/or numeric representation of the penetration depth of the ground engaging tools. For example, the sensor 40 may be configured to output signals indicative of a height of the implement frame above the soil surface. The controller 116 may receive these signals and compute a penetration depth of the ground engaging tools based on the frame height. The controller 116 may then output signals indicative of the penetration depth to the user interface 118 such that the penetration depth may be presented to the operator via the display 120. As previously discussed, certain implements 10 include multiple frame sections having multiple sensors. In such embodiments, the controller 116 may receive signals from each sensor, and compute the penetration depth of ground engaging tools of each frame section. In addition, the controller 116 may also be configured to compute an average height and/or an orientation of each frame section based on the signals. Such information may be sent to the user interface 118 and presented on the display 120 as a graphical and/or numeric representation of the information. As will be appreciated, the controller 116 may be communicatively linked to the user interface 118 and/or the sensor 40 by a wireless connection, a wired connection, or an optical fiber connection, for example. Furthermore, the communication links may employ any suitable communication protocol such as CAN Bus or ISO Bus, for example.

Furthermore, the operator may input a desired penetration depth of the ground engaging tools via the input device 122. For example, in certain embodiments, the input device 122 may include a numeric keypad that enables an operator to input a desired penetration depth in predetermined units (e.g., inches, centimeters, etc.). The display 120 may present a numeric representation of the desired penetration depth and a numeric representation of the measured penetration depth of each ground engaging tool. The user interface 122 may also enable the operator to initiate an automatic adjustment of the frame height to transition the actual penetration depth of the ground engaging tools to the desired penetration depth. For example, if the measured penetration depth is shallower than the desired penetration depth, the fluid control unit 118 may automatically increase the penetration depth of the ground engaging tools.

In embodiments having a single frame section, the controller 116 may first receive signals indicative of the frame height from the sensor 40. The controller 116 may then compute the penetration depth of the ground engaging tools based on the signals. If the computed penetration depth is shallower than the desired penetration depth, the controller 116 will activate the second actuator 114 to transition the depth control valve 100 to the third position 110. As a result, a fluid connection will be established between the supply conduit 102 and the second conduit 78, and between the return conduit 104 and the first conduit 76. Consequently, pressurized fluid will flow into the rod side 84 of the fourth depth control cylinder 36, thereby inducing each piston rod 98 to retract. As the piston rods 98 retract, the respective ground engaging wheels will move upwardly relative to the frame, thereby lowering the height of the frame and increasing the penetration depth of the ground engaging tools. Once the desired penetration depth has been achieved, as measured by the sensor 40, the controller 116 will transition the depth control valve 100 to the first position 106, thereby blocking fluid flow to the cylinders 36.

Conversely, if the computed penetration depth is deeper than the desired penetration depth, the controller 116 will activate the first actuator 112 to transition the depth control valve 100 to the second position 108. As a result, a fluid connection will be established between the supply conduit 102 and the first conduit 76, and between the return conduit 104 and the second conduit 78. Consequently, pressurized fluid will flow into the cap side 82 of the first depth control cylinder 36, thereby inducing each piston rod 98 to extend. As the piston rods 98 extend, the respective ground engaging wheels will move downwardly relative to the frame, thereby raising the height of the frame and decreasing the penetration depth of the ground engaging tools. Once the desired penetration depth has been achieved, as measured by the sensor 40, the controller 116 will transition the depth control valve 100 to the first position 106, thereby blocking fluid flow to the cylinders 36.

As will be appreciated, the controller 116 may periodically adjust fluid flow to the depth control cylinders 36 as the implement 10 is pulled through a field to ensure that the penetration depth of the ground engaging tools 20 remains within a desired tolerance. For example, the controller 116 may compare the measured penetration depth to the desired penetration depth at discrete intervals (e.g., 0.1 Hz, 0.5 Hz, 1 Hz, 2 Hz, etc.). If the difference between the measured penetration depth and the desired penetration depth is greater than a predetermined tolerance (e.g., 1 inch, 0.5 inches, 0.25 inches, 0.1 inches, etc.), the controller 116 may actuate the depth control valve 100 to either extend or retract the depth control cylinders 36, thereby compensating for the variation in penetration depth. In certain embodiments, the tolerance may be manually input (e.g., via the input device 122), thereby enabling an operator to specify the desired tolerance. Furthermore, it should be appreciated that a first tolerance may be employed to determine whether the penetration depth is shallower than desired, and a second tolerance may be employed to determine whether the penetration depth is deeper than desired.

Figure 4:
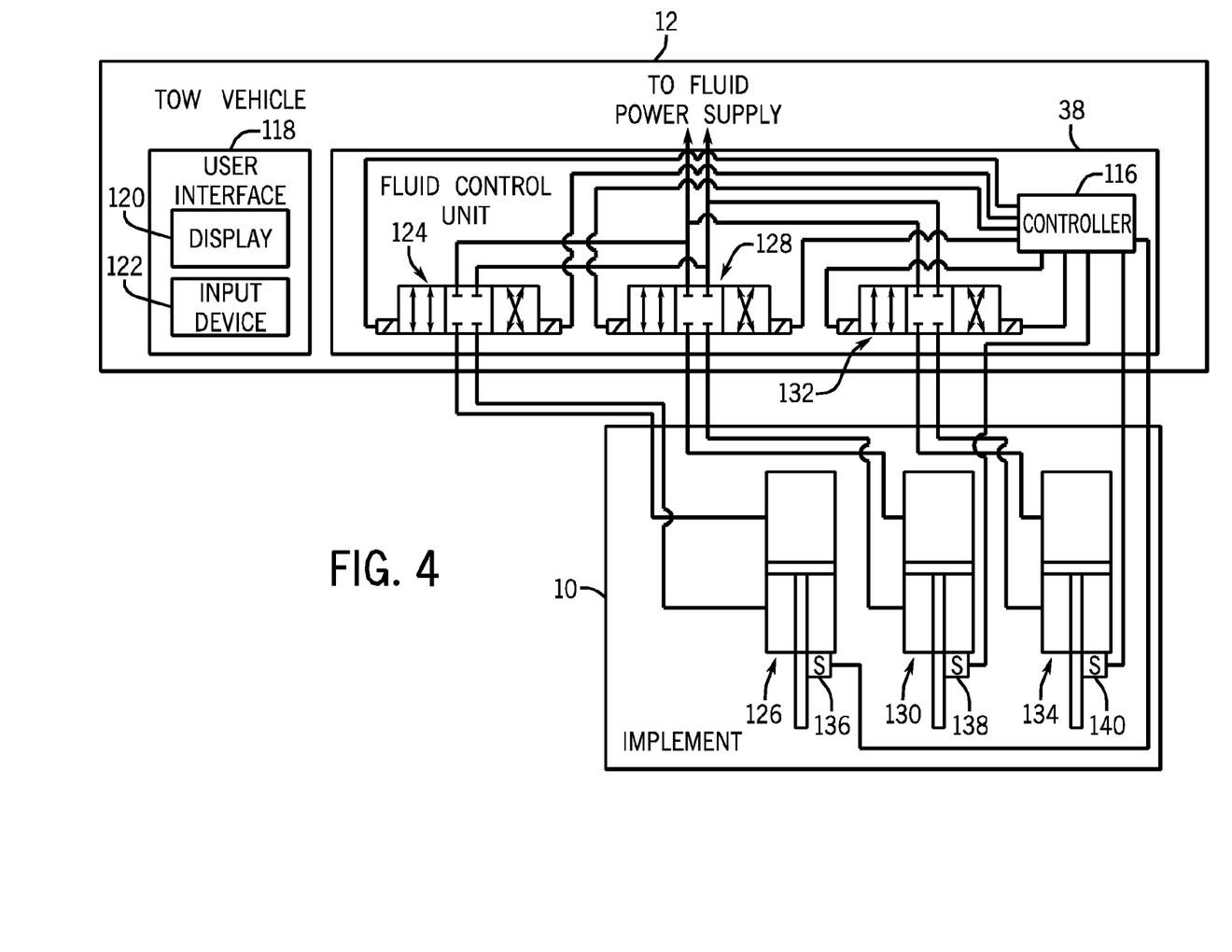
FIG. 4 is a schematic diagram of an alternative embodiment of a fluid control unit configured to automatically adjust a penetration depth of ground engaging tools coupled to multiple frame sections.

FIG. 4 is a schematic diagram of an alternative embodiment of a fluid control unit 38 configured to automatically adjust a penetration depth of ground engaging tools coupled to multiple frame sections. In the illustrated embodiment, the fluid control unit 38 includes a first depth control valve 124 configured to adjust fluid flow to a first depth control cylinder 126, a second depth control valve 128 configured to adjust fluid flow to a second depth control cylinder 130, and a third depth control valve 132 configured to adjust fluid flow to a third depth control cylinder 134. Similar to the embodiment described above with reference to FIG. 3, each depth control valve 124, 128 and 132 is a three-position/four-way hydraulic valve configured to control a flow of hydraulic fluid to a respective cylinder 126, 130 and 134. However, it should be appreciated that pneumatic directional control valves may be employed in embodiments utilizing pneumatic cylinders. Furthermore, each depth control valve includes two actuators communicatively coupled to the controller 116 and configured to adjust the position of the respective valve. Consequently, the controller 116 may adjust fluid flow to each cylinder 126, 130 and 134 by adjusting the position of a respective depth control valve.

In certain embodiments, each depth control cylinder is coupled to a ground engaging wheel assembly of a respective frame section. For example, in the illustrated embodiment, the implement 10 may include three frame sections. The first depth control cylinder 126 may adjust the height of the first frame section, the second depth control cylinder 130 may adjust the height of the second frame section, and the third depth control cylinder 134 may adjust the height of the third frame section. In certain embodiments, each frame section may include a single ground engaging wheel assembly, actuated by a respective depth control cylinder. Alternatively, each depth control cylinder may be configured to actuate multiple ground engaging wheel assemblies (e.g., via a linkage) within a respective frame section. In further embodiments, each depth control valve may be fluidly coupled to multiple depth control cylinders (e.g., in a serial flow arrangement) within a respective frame section. In such configurations, the fluid control unit 38 may independently adjust the height of each frame section, thereby enabling the ground engaging tools to maintain a desired penetration depth despite variations in the soil surface.

While three depth control valves are employed in the illustrated embodiment to control the height of three frame sections, it should be appreciated that alternative embodiments may include more or fewer depth control valves to control the height of more or fewer frame sections. For example, certain embodiments may include 1, 2, 3, 4, 5, 6, or more frame sections. In such embodiments, the number of depth control valves within the fluid control unit 38 may correspond to the number of frame sections, thereby facilitating independent height adjustment of each frame section. In further embodiments, multiple depth control valves may be coupled to multiple depth control cylinders within a single frame section, thereby enabling the fluid control unit 38 to adjust the height and the orientation of the frame section. For example, in certain embodiments, each frame section of a multi-section implement may include a first ground engaging wheel assembly positioned at a front of the frame section, and a second ground engaging wheel assembly positioned at a rear of the frame section. In such embodiments, each ground engaging wheel assembly may include a depth control cylinder fluidly coupled to a respective depth control valve within the fluid control unit 38. Consequently, the controller 116 may be configured to tilt the frame section by varying the height of the ground engaging wheels of the first and second ground engaging wheel assemblies. As previously discussed, certain frame sections may include four independently controllable ground engaging wheel assemblies to control tilt about multiple axes. Furthermore, other frame sections may include 1, 2, 3, 4, 5, 6, or more independently adjustable wheel assemblies and a corresponding number of depth control valves within the fluid control unit 38, thereby enabling the fluid control unit 38 to vary the height and the orientation of each frame section.

In the illustrated embodiment, the first depth control cylinder 126 includes a sensor 136 having a linear potentiometer configured to measure a position of the piston rod relative to the barrel of the cylinder. Consequently, the sensor 136 will output signals to the controller 116 indicative of the extension and retraction of the rod. As previously discussed, each depth control cylinder is configured to adjust the height of a ground engaging wheel relative to the frame of the implement, thereby varying the penetration depth of the ground engaging tools. Therefore, the controller 116 may determine the penetration depth of the ground engaging tools based on the signals output from the sensor 136. Similarly, the second depth control cylinder 130 includes a second sensor 138, and the third depth control cylinder 134 includes a third sensor 140. If each depth control cylinder 126, 130 and 134 is configured to adjust the height of a respective frame section, the controller 116 may automatically maintain a desired penetration depth of the ground engaging tools by receiving signals from the sensors 136, 138 and 140, and adjusting fluid flow to the cylinders 126, 130 and 134 to compensate for variations in the computed penetration depth. Alternatively, if the first depth control cylinder 126 is positioned at a front of a frame section and the second depth control cylinder 130 is positioned at a rear of the frame section, the controller 116 may adjust the position of the first and second depth control valves 124 and 128 to tilt the frame section to an orientation substantially parallel to the soil surface, thereby substantially maintaining the penetration depth of the ground engaging tools.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
    a fluid control unit configured to mount to a tow vehicle;
    an implement having a frame, a ground engaging tool coupled to the frame, and a ground engaging wheel configured to support the frame during operation of the implement;
    a depth control cylinder fluidly coupled to the fluid control unit, wherein the depth control cylinder is configured to adjust a penetration depth of the ground engaging tool by varying a height of the ground engaging wheel relative to the frame; and
    a sensor communicatively coupled to the fluid control unit and configured to output signals indicative of the penetration depth of the ground engaging tool;
    wherein the fluid control unit is configured to automatically control fluid flow to the depth control cylinder based on the signals to maintain a user-selectable penetration depth;
    wherein the fluid control unit include a depth control valve configured to selectively direct pressurized fluid to a cap side of the depth control cylinder thereby adjusting the height of the frame relative to a soil surface.

2. The agricultural implement system of claim 1, comprising a ground engaging wheel assembly having an arm rotatably coupled to the frame via a rockshaft, wherein the arm comprises a first end configured to support the ground engaging wheel, and a second end coupled to the depth control cylinder, and the depth control cylinder is configured to rotate the arm to vary the height of the ground engaging wheel relative to the frame.

3. The agricultural implement system of claim 2, wherein the sensor comprises a potentiometer configured to measure a rotation of the arm relative to the frame.

4. The agricultural implement system of claim 1, wherein the sensor comprises a linear potentiometer coupled to the depth control cylinder and configured to measure a position of a rod extending from the depth control cylinder.

5. The agricultural implement system of claim 1, wherein the sensor comprises a transducer configured to measure a position of the frame relative to a soil surface.

6. The agricultural implement system of claim 1, wherein the implement does not comprise a depth control valve configured to control fluid flow to the depth control cylinder.

7. The agricultural implement system of claim 1, wherein the implement comprises a plurality of ground engaging wheels and a corresponding plurality of depth control cylinders, and the plurality of depth control cylinders are fluidly coupled to one another in a serial flow arrangement.

8. The agricultural implement system of claim 1, wherein the implement comprises a plurality of frame sections, and an elevation of each frame section relative to a soil surface is independently adjustable.

9. The agricultural implement system of claim 8, wherein each frame section comprises a respective depth control cylinder in fluid communication with the fluid control unit, and the fluid control unit is configured to independently control fluid flow to each depth control cylinder to adjust the elevation of each frame section relative to the soil surface.

10. The agricultural implement system of claim 8, wherein each frame section comprises a respective sensor communicatively coupled to the fluid control unit, and each sensor is configured to output respective signals indicative of a corresponding penetration depth of a respective ground engaging tool.

11. An agricultural implement system, comprising:
a depth control valve configured to mount to a tow vehicle;
a controller configured to mount to the tow vehicle and communicatively coupled to the depth control valve;
an implement having a frame, a ground engaging tool coupled to the frame, and a ground engaging wheel configured to support the frame during operation of the implement;
a depth control cylinder mounted to the frame and fluidly coupled to the depth control valve, wherein the depth control cylinder is configured to adjust a penetration depth of the ground engaging tool by varying a height of the ground engaging wheel relative to the frame, and the depth control valve is configured to control fluid flow to the depth control cylinder; and
a sensor communicatively coupled to the controller and configured to output signals indicative of the penetration depth of the ground engaging tool;
wherein the controller is configured to automatically adjust the depth control valve based on the signals to maintain a user-selectable penetration depth;
wherein the controller include a depth control valve configured to selectively direct pressurized fluid to a cap side of the depth control cylinder thereby adjusting the height of the frame relative to a soil surface.

12. The agricultural implement system of claim 11, comprising a ground engaging wheel assembly having an arm rotatably coupled to the frame via a rockshaft, wherein the arm comprises a first end configured to support the ground engaging wheel, and a second end coupled to the depth control cylinder, and the depth control cylinder is configured to rotate the arm to vary the height of the ground engaging wheel relative to the frame.

13. The agricultural implement system of claim 11, wherein the implement comprises a plurality of ground engaging wheels and a corresponding plurality of depth control cylinders, and the plurality of depth control cylinders are fluidly coupled to one another in a serial flow arrangement.

14. The agricultural implement system of claim 11, wherein the implement comprises a plurality of frame sections, an elevation of each frame section relative to a soil surface is independently adjustable, and each frame section comprises a respective depth control cylinder configured to vary a respective height of a corresponding ground engaging wheel relative to the frame section.

15. The agricultural implement system of claim 14, comprising a plurality of depth control valves configured to mount to the tow vehicle, wherein each depth control valve is fluidly coupled to a respective depth control cylinder, and the controller is configured to independently adjust each depth control valve to vary fluid flow to the respective depth control cylinder.

16. An agricultural implement system, comprising:
a plurality of depth control valves configured to mount to a tow vehicle;
a controller configured to mount to the tow vehicle and communicatively coupled to the plurality of depth control valves;
an implement having a plurality of frame sections, wherein each frame section includes a ground engaging tool coupled to the frame section, an elevation of each frame section relative to a soil surface is independently adjustable, and each frame section includes a ground engaging wheel configured to support the frame section during operation of the implement;
a plurality of depth control cylinders, wherein each depth control cylinder is in fluid communication with a respective depth control valve, each depth control cylinder is mounted to a respective frame section, each depth control cylinder is configured to adjust a penetration depth of a respective ground engaging tool by varying a height of a respective ground engaging wheel relative to the respective frame section, and each depth control valve is configured to control fluid flow to the respective depth control cylinder; and
a plurality of sensors communicatively coupled to the controller and configured to output signals indicative of the respective penetration depth of each ground engaging tool;
wherein the controller is configured to automatically adjust each depth control valve based on the signals to maintain a user-selectable penetration depth;
wherein the fluid control unit include a depth control valve configured to selectively direct pressured fluid to a cap side of the depth control cylinder thereby adjusting the height of the frame relative to a soil surface.

17. The agricultural implement system of claim 16, wherein each frame section comprises a first ground engaging wheel positioned at a front of the frame section, and a second ground engaging wheel positioned at a rear of the frame section, wherein an orientation of the frame section relative to the soil surface is adjustable by varying the height of each ground engaging wheel relative to the frame section.

18. The agricultural implement system of claim 17, comprising:
a first depth control cylinder configured to vary a first height of the first ground engaging wheel relative to the frame section;
a first depth control valve configured to control fluid flow to the first depth control cylinder;
a second depth control cylinder configured to vary a second height of the second ground engaging wheel relative to the frame section; and
a second depth control valve configured to control fluid flow to the second depth control cylinder;
wherein the controller is configured to adjust the first depth control valve, the second depth control valve, or a combination thereof, to vary the orientation of the frame section relative to the soil surface.

19. The agricultural implement system of claim 16, wherein each frame section comprises a ground engaging wheel assembly having an arm rotatably coupled to the frame section via a rockshaft, the arm comprises a first end configured to support the ground engaging wheel, and a second end coupled to the depth control cylinder, and the depth control cylinder is configured to rotate the arm to vary the height of the ground engaging wheel relative to the frame section.

20. The agricultural implement system of claim 16, wherein each sensor comprises a linear potentiometer coupled to a respective depth control cylinder, and each sensor is configured to measure a position of a rod extending from the respective depth control cylinder.

* * * * *